(12) United States Patent
D'Souza

(10) Patent No.: US 6,691,169 B1
(45) Date of Patent: Feb. 10, 2004

(54) METHOD AND APPARATUS FOR DETECTING ROUTE ADVERTISEMENT VIOLATIONS IN A NETWORK OF INTERCONNECTED PEERS

(75) Inventor: Kevin L D'Souza, Pittsburgh, PA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/495,112

(22) Filed: Feb. 1, 2000

(51) Int. Cl.[7] .............................................. G06F 13/00
(52) U.S. Cl. ...................... 709/242; 709/238; 370/255
(58) Field of Search ................................ 709/200, 201, 709/212, 213, 214, 217, 218, 219, 220, 221, 223, 224, 238, 242; 370/254, 255

(56) References Cited

U.S. PATENT DOCUMENTS

| 5,142,531 A | * | 8/1992 | Kirby ..................... 395/200.54 |
| 5,774,530 A | * | 6/1998 | Montgomery et al. ....... 379/112 |
| 5,870,556 A | * | 2/1999 | Cote et al. .............. 395/200.54 |
| 5,953,347 A | * | 9/1999 | Wong et al. ................. 370/469 |
| 5,987,521 A | * | 11/1999 | Arrowood et al. .......... 709/239 |
| 6,009,081 A | * | 12/1999 | Wheeler et al. ............. 370/255 |
| 6,108,637 A | * | 8/2000 | Blumenau ...................... 705/7 |
| 6,477,178 B1 | * | 11/2002 | Wakim et al. ............... 370/466 |

OTHER PUBLICATIONS

Multihoming your Internet service with BGP, Chris Lewis and Thanh Nguyen, Network Computing, 1997, n 813, PG118.*

* cited by examiner

Primary Examiner—Moustafa M. Meky
(74) Attorney, Agent, or Firm—Henry Brendzel

(57) ABSTRACT

Routing violations in a network (10) of interconnected peers (12, 14, 16, 18, 20, 22, and 24) are detected and reported by a monitoring system (62) which does so by first collecting the routing information from each peer (including advertised routes) and then comparing such routes to those officially advertised by each peer. Any officially advertised route not found is reported as a "missing route," while routes that are different from those officially advertised are reported as "modified".

14 Claims, 3 Drawing Sheets

METHOD AND APPARATUS FOR DETECTING ROUTE ADVERTISEMENT VIOLATIONS IN A NETWORK OF INTERCONNECTED PEERS

TECHNICAL FIELD

This invention relates to a technique for monitoring routes that have been advertised to other networks (ISPs) on the Internet.

BACKGROUND ART

The Internet comprises the largest known network of interconnected computers, each typically linked to others via a high-speed data link. While large entities such as corporations and universities may enjoy a direct link to the Internet, most individuals obtain access through an Internet Service Provider (ISP) such as AT&T Worldnet, for example. In the past, individuals have obtained such access through a dial-up telephone link. However, individuals can now obtain Internet access through via cable television networks and satellite links.

To facilitate a link between individuals connected to separate ISPs, at least one route must exist between the two ISPs. Moreover, an ISP intending to send data to another ISP must know of the existence of such a route. For that reason, ISPs will "advertise" (i.e., communicate) such routing information to their peers to facilitate such connections. Most ISPs have implemented well-defined policies regarding which routes are advertised to their peers. Such policies attempt to ensure that packets inbound to an ISP from an external source take a predictable path across the Internet. However, ISPs have limited control over what their Internet peers (or other downstream peers) do with the advertised routes. For example, one ISP may readily modify an officially advertised route of another. Modifications of an ISP's original advertised route can result in mis-routing of packets, including the complete loss or "black-holing" of such packets. This problem is complicated by the large number of ISPs in existence today.

Most ISPs lack control over what they accept as an advertised route. For that reason, incorrect advertised routes from one Peer (ISP) can and do propagate to numerous other Internet Peers, effecting customers on all Peers that accept and use that advertised route. Presently, no industry-wide standards exist that govern modification of officially advertised routes. Further, there is no industry-wide pro-active method to notify an ISP if there is a violation of its routing policy by an external peer.

Thus, there is need for a technique for detecting violations of advertised routes.

BRIEF SUMMARY OF THE INVENTION

Briefly, the present invention provides a technique for detecting and reporting routing violations in a network of interconnected peers, such as the Internet. In accordance with a preferred embodiment, routing information, including advertised routes, is received from each peer by a monitoring apparatus. In accordance with such routing information, the monitoring apparatus detects if a violation has occurred with respect to any advertised route. If so, the monitoring apparatus reports that violation so that appropriate action can be taken to correct the route violation, such as restoring a missing route, or updating the routing information maintained by the various peers to correct the modified routes.

DETAILED DESCRIPTION

Figure 1:
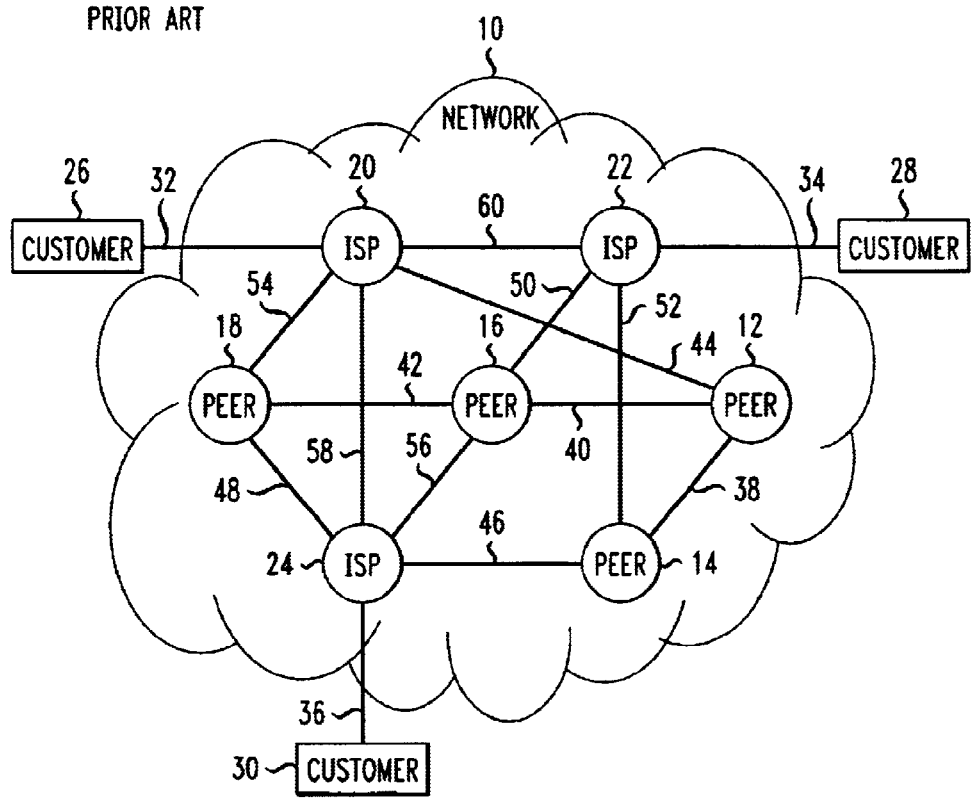
FIG. 1 is a block schematic diagram of diagram of a prior art network comprised of interconnected peers.

FIG. 1 depicts a block schematic diagram of a network 10 of interconnected nodes, represented by peers 12, 14, 16, and 18, and Internet Service Provider Networks (ISPs) 20, 22 and 24, respectively. Each of peers 12, 14, 16, and 18 comprises one or more elements as a router, or a network of interconnected routers. Each of the ISPs 20, 22, and 24 comprises a gateway that allows a corresponding one of customers 26, 28, and 30, respectively, to gain access to the network 10 via an associated one of links 32, 34, and 36, respectively. The links 32, 34 and 36 may comprise dial-up telephone links, dedicated links, satellite links, DSL links, or other communications channel between the customer and corresponding ISP.

Within the network 10, various links exist between the peers 12, 14, 16, and 18 and the ISPs 20, 22, and 24. In the illustrated embodiment, the following links provide connectivity between the associated peer-peer, peer-ISP and ISP-ISP pairs (endpoints):

| Link Number | End Points |
| --- | --- |
| 38 | peer 12-peer 14 |
| 40 | peer 12-peer 16 |
| 42 | peer 16-peer 18 |
| 44 | peer 12-ISP 20 |
| 46 | peer 14-ISP 24 |
| 48 | peer 18-ISP 24 |
| 50 | peer 16-ISP 22 |
| 52 | peer 14-ISP 22 |
| 54 | peer 18-ISP 20 |
| 56 | peer 16-ISP 24 |
| 58 | ISP 20-ISP 24 |
| 60 | ISP 20-ISP 22 |

To facilitate transmission of data through the network 10, among the customers 26, 28 and 30, each ISP and each peer will typically "advertise" (e.g., inform) their neighboring peers and ISPs of available routes to those customers. This ensures that traffic travels within the network 10 across predictable paths and in-turn reaches the right destination. Thus, for example, the ISP22 may hear a route advertisement for customer 30 of ISP 24 from Peer 16, and in-turn advertise the availability of a route to customer 30 of ISP 24, comprised of link 50, peer 16, and beyond. The other ISPs and peers within the network 10 may similarly advertise available routes to other destinations. However, each ISP or peer advertising a particular route to a destination typically has little or no control over the quality of the route for portions of such advertised routes that are downstream therefrom. Thus, with regard to the previously discussed route to customer 30 of ISP 24 advertised by the ISP 22, control of certain portions of that advertised route (e.g., Peer 16) typically may not reside with ISP 22. Thus, while the ISP 22 may advertise the route to customer 30 as available, it may have been incorrectly modified by Peer 18 to reflect a lower cost that the route advertised from Peer 16. This lower cost route would then be propagated via link 54, ISP 20 and link 60, to ISP 22 and represent itself as the best route to customer 30 of ISP 24. Packets to customer 30 would then take the path of link 60, ISP 20, link 54 and Peer 18. For reasons not discussed here, if Peer 18 has no further information to get back to ISP 24, the packets destined for customer 30 of ISP 24 will be black-holed at Peer 18. It can therefore be seen that such modifications may result in mis-routing of packets, including the complete loss or "black-holing" of such packets. On the other hand, modifications of advertised routes may actually enhance performance. Although an enhancement of an advertised route is generally desirable, such a modification still represents a routing violation from the standpoint that the actual characteristics of the route differs from the advertised characteristics.

Figure 2:
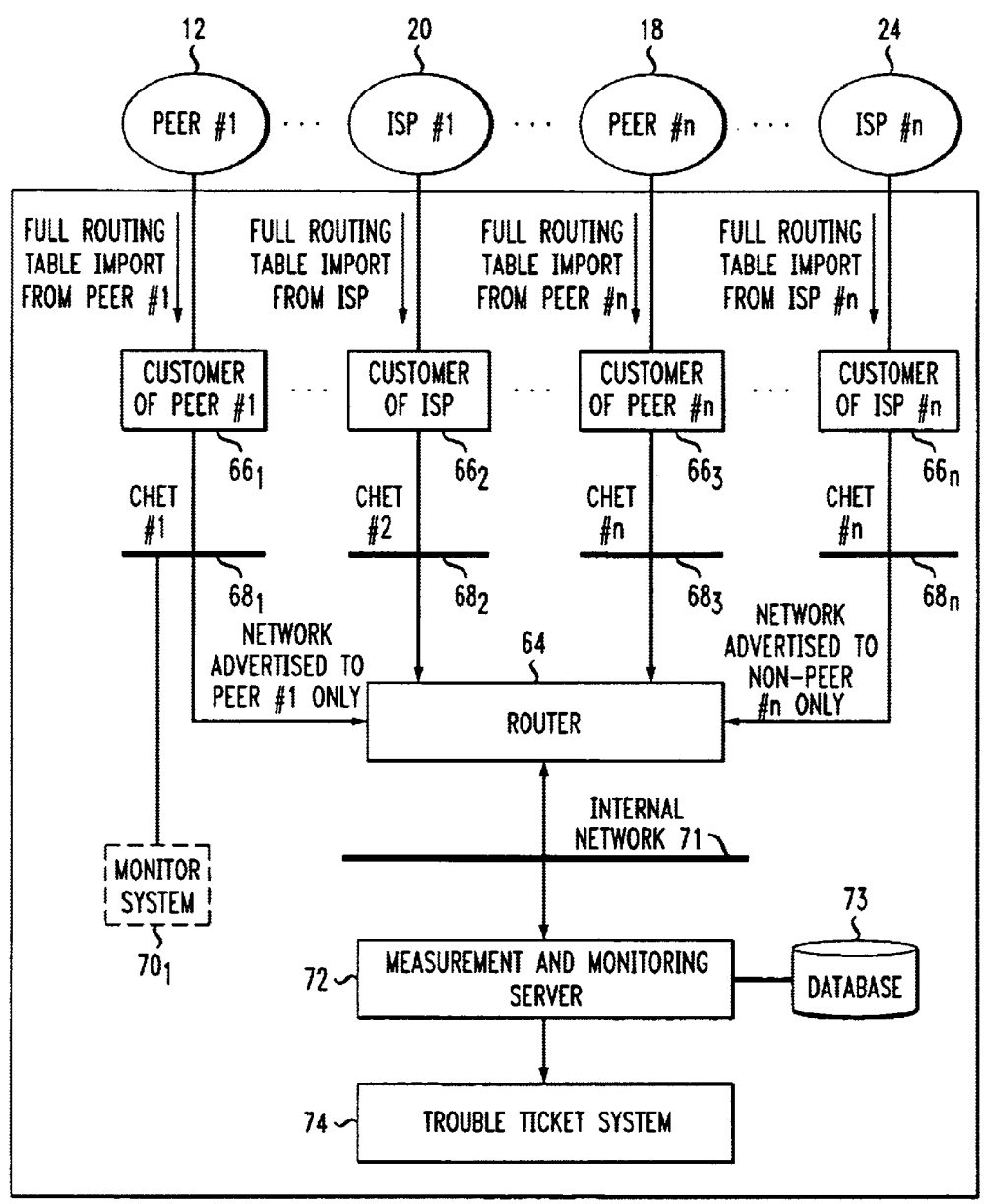
FIG. 2 is block schematic diagram of a monitoring system in accordance with the invention for detecting and reporting violations of advertised routes within the network of FIG. 1.

FIG. 2 depicts a block schematic diagram of a monitoring system 62 in accordance with a preferred embodiment of the invention for detecting and reporting routing violations of advertised routes in the network 10 of FIG. 1. The system 62 includes a router 64 of the type manufactured by Cisco Inc., for example, with optional Network Address Translation (NAT) capability to enhance its security. The router 64 enjoys a communications link (with "firewall protection"), to each of the peers, ISPs as well as and non-peers (not shown) within the network 10 of FIG. 1 to receive "full" routing information therefrom. The "full" routing information includes the entire routing table from each peer, ISP and non-peer. For purposes of simplicity, only the links to peers 12 and 18 and ISPs 20 and 24 are explicitly shown in FIG. 2.

A respective one of buffers $66_1$–$66_n$ holds the routing information received from each peer and ISP (as well as each non-peer), where n is an integer corresponding to the number of separate sources of routing information (i.e., the sum of peers, ISPs and non-peers) in the network 10. Thus, as depicted in FIG. 2, buffers $66_1$, $66_2$, $66_3$ and $66_n$ receive and hold full routing information from peer 12, ISP 20, peer 18 and ISP 24, respectively. The router 64 may enjoy a direct connection to each of buffers $66_1$–$66_n$ or alternatively, may enjoy a link though one of customer networks $68_1$–$68_n$, respectively. Each of the customer networks $68_1$–$68_n$ may have an associated monitoring system, such as monitoring system 70, associated with customer network 681 While FIG. 2 depicts a separate one of buffers $66_1$–$66_n$ for holding the routing information from a corresponding one of the peers, ISPs and non-peers, a smaller number of buffers or even a single buffer could be employed for this purpose.

The router 64 possesses a communication link, typically in the form of an internal network 71, to a measurement and monitoring server 72. The server 72 typically takes the form of a computer or the like, having links to one of databases, such as database 73, that stores data that enables the server to execute various tests on the routing information to detect and report violations of advertised routes. As will become better understood by reference to FIG. 3, among the tests executed by the server 72 is a comparison of the received routing information to reference routing information that is stored in the database 73 to detect missing or modified routes. Upon detecting a missing or modified route, the server 72 may issue a note to a trouble ticket system 74 that in turn issues a notification to a technician who will manually proceed to take the appropriate action to correct the routing violation, such as repairing a broken link in the case of a missing route. The trouble ticket system 74 may also possess the capability of acting automatically, such as updating peer, ISP, and non-peer routing tables to correct a missing or modified route.

Figure 3:
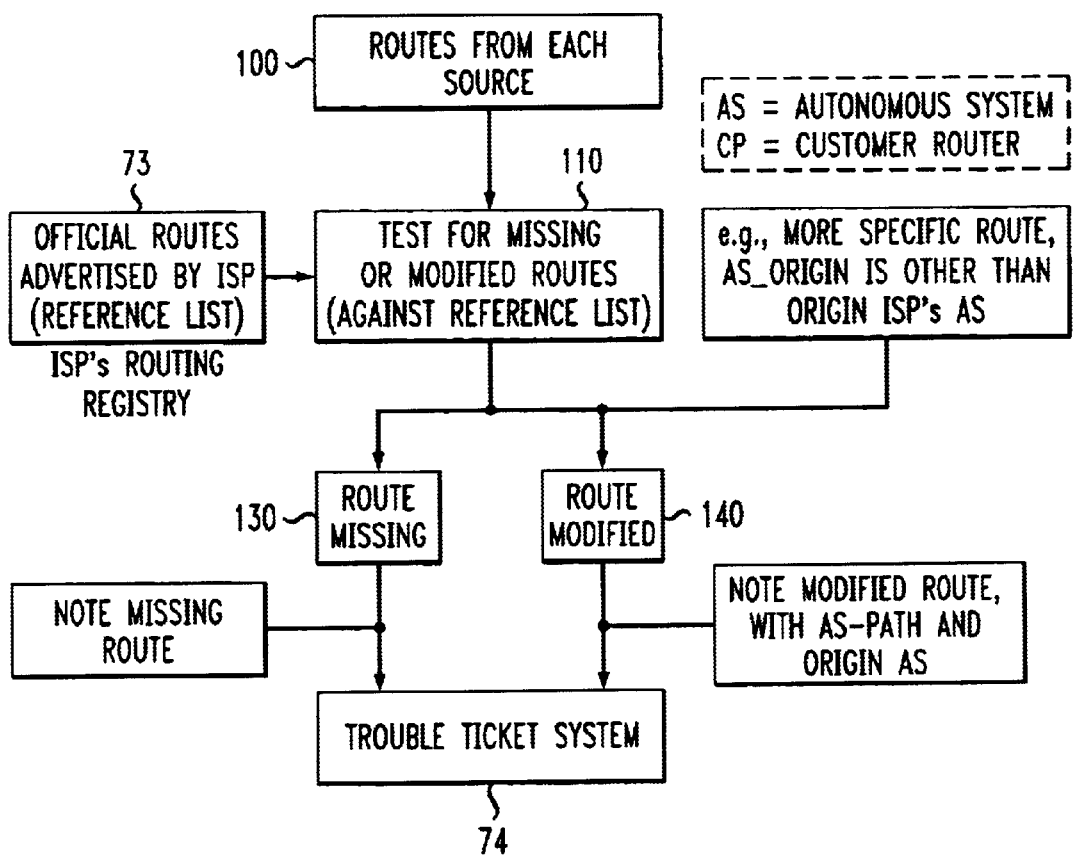
FIG. 3 is a flow chart diagram illustrating the steps performed by the monitoring system of FIG. 2 to detect and report routing violations.

FIG. 3 depicts in flow chart form the steps executed by the server 72 of FIG. 2 to detect and report violations of routes advertised by the peers 12—18, ISPs 20–24 and non-peers (not shown) of FIG. 1. The process executed by the server 72 of FIG. 2 to detect and report advertised route violations commences upon receipt of the full routing information from each source (i.e., peer, ISP and non-peer) during step 100 of FIG. 3. Thereafter, the server 72 tests for missing as well as modified routes during step 110. Typically, the server 72 of FIG. 2 tests for missing as well as modified routes by comparing the routing information received during step 110 to a reference list of routes officially advertised by each ISP obtained by querying the database 73 containing such information.

During the comparison performed during step 110 of FIG. 3, the server 72 may discover that an advertised route no longer exists within ISP 20. For example, the ISP 20 of FIG. 1 may not see a route to customer 30 of ISP 24, while that route is being advertised by ISP 24 directly to ISP 20 for reasons not discussed here. Thus, while the ISP 24 of FIG. 1 may advertise this route, in actuality the route is "missing" in ISP 20, and any packets destined from ISP 20 back to customer 30, cannot pass there-across. Thus, during the comparison step 110 of FIG. 3, the server 72 of FIG. 2 will find this previously advertised route missing from the actual list of routes monitored in ISP 20, whereupon the server will report the route missing during step 130.

During the comparison performed during step 110, the server 72 may find that the advertised route exists, but not in its original form. For example, although ISP 24 advertises a route to customer 30 with itself (ISP 24) as the origin of that route (AS_Origin), Peer 16 may choose an alternate route to customer 30, incorrectly advertised from Peer 14 via Peer 12, since it may have been advertised with a lower cost. In this case, there will be an incorrect AS_Origin of Peer 14 associated with it. In such cases, peer 16, instead of routing traffic to the ISP 24 over link 56, may actually route the traffic over link 40, peer 12, link 38 and peer 14, all of FIG. 1. This route will in turn lead to black-holing of the packets destined for customer 30 of ISP 24. In the above example, there is a route where the actual Autonomous System origin (AS_origin) is other than the origin ISP's Autonomous System (ISP 24). Upon detecting a modified route, the server 72 issues a report during step 140 of FIG. 3 that the route under scrutiny was modified.

Following step 130 upon detection of a missing route, the server 72 of FIG. 2 issues a note of a missing route, to the trouble ticket system 74 of FIG. 2. In a similar manner, the server 72 of FIG. 2, upon detecting a modified route, then issues a note indicating a modified route (with the AS-Path and origin AS information) to the trouble ticket system 74. In response, the trouble ticket system 74 alerts a technician to manually undertake needed work to address the problem associated with the missing and modified routes. Such work may include repair or replacement of any malfunctioning hardware and/or software, and/or updating of routing information. The trouble ticket system 74 may itself effect the needed work and/or routing updates automatically, or cause other systems (not shown) to do so automatically.

The monitoring system 62 of FIG. 2 affords the ability to detect the following types of routing violations:

Missing Routes to an Autonomous System Backbone

To detect this type of violation, the monitoring systems 62 compares a reference list of routes propagated by a particular Autonomous System Backbone against the list of routes received from each of the Internet Peers. The monitoring system 62 flags routes missing from the Peer list as missing from the routing tables of the Internet Peer. For customer routers under control of the Autonomous System, the frequency of monitoring is only limited by the speed at which such a query can be completed. The server 72 can automate such testing by providing the launching point for the test across all the Internet Peers.

Incorrect Routes to the Autonomous System Backbone

The monitoring system 62 can detect this type of violation in a manner similar to detecting missing routes to the Autonomous System backbone. The server 72 compares a reference list of routes propagated by the Autonomous System Backbone against the list of routes received from each of the Internet Peers. Routes that are inconsistent with those in the reference list are flagged as incorrect. A simple implementation of this could include inspecting the AS-Path string of each route that is known to be propagated and ensuring that the Autonomous System Number associated with the Autonomous System Backbone occurs in the right position. As before, the server 72 of FIG. 2 performs this operation automatically.

Non-Optimal Routes

To detect non-optimal routes, the server 72 will may initiate periodic tracing of routes, typically via a monitoring system associated with each cnet network, such as monitoring system 70, associated with the network 68, is shown in FIG. 2. The results are compared to the intended routes obtained by querying a database, such as database 73 of FIG. 2. Alternatively, the server may perform AS-Path analysis on routes received from a customer router.

Black-holed Routes

In practice, "black holed" routes are detected by employing monitoring techniques associated with missing and incorrect routes.

Independent Verification of Receipt of New Route Advertisements

In many instances, independent verification of receipt of new routing advertisements at one or more peers is desirable. The monitoring system 62 of FIG. 2 provides a mechanism to verify if newly provisioned route advertisements from an Autonomous System Backbone have reached one or more Peers. The monitoring system 62 can effect such verification by simply looking for the presence of such advertised routes. Such verification could occur during the provisioning process for customers that need their routes advertised externally.

Connectivity and Packet Loss Monitoring to Points in the Autonomous System Backbone Network The monitoring system 62 of FIG. 2 could measure connectivity and packet loss for packets traversing between an Autonomous System Backbone and one or more of the cnet networks $68_1$–$68_n$ as an indication of what a customer would see if their packets traverse that peer. Note that the quality of such a measurement can be improved by increasing geographical diversity of the customer routers across a peer.

Comparison of Connectivity Profiles between an Autonomous System Backbone and Peers Connected to that Backbone The monitoring system 62 can provide an independent verification point for connectivity to networks/sites external to an Autonomous System Backbone. For example, the monitoring system could automatically test for set for connectivity to major web sites on the Internet, and verify the success rate with that of similar connectivity tests originated from within the Autonomous System Backbone. As a related task, the monitoring system 62 could keep a track of BGP Route announcements and withdrawals from each of the peers, and compare them to what is seen in the Autonomous Service Backbone.

Detection of Transported IP Addresses

The monitoring system 62 can detect cases of address space incorrectly advertised by peers connected to an Autonomous System Backbone. The monitoring system 62 does so by simply looking for the presence of a withdrawn route in a customer's router, and analyzing the AS-Path associated with the route to identify the origin AS. An origin AS other than a particular Autonomous System Provider Backbone indicates a problem with transported IP addresses.

The foregoing describes a technique for detecting and reporting routing violations in a network of interconnected peers.

The above-described embodiments merely illustrate the principles of the invention. Those skilled in the art may make various modifications and changes that will embody the principles of the invention and fall within the spirit and scope thereof.

What is claimed is:

1. A method for detecting and reporting routing violations in a network of interconnected peers, comprising the steps of:

receiving from each peer routing information that includes routes actually advertised by said each peer to others;

processing said routing information to detect whether a violation has occurred with respect to each advertised route, caused by routing information of one of said actually advertised routes, and if so, reporting said violation for subsequent action.

2. The method according to claim 1 wherein the step of processing said routing information includes the steps of:

querying a database containing a reference list of each route officially advertised by each peer to obtain said officially advertised routes;

comparing the officially advertised routes to the actually advertised routes to detect routing violations.

3. The method according to claim 2 wherein a missing route violation is reported when any of said officially advertised routes is missing from said actually advertised routes.

4. The method according to claim 2 where a modified route violation is reported when any of said officially advertised routes differs from said actually advertised routes.

5. The method according to claim 2 further including the steps of:

periodically tracing routes between peers;

querying a database to obtain information of intended paths between peers; and comparing said periodically traced routes to said intended routes and reporting a non-optional route when a difference exists therebetween.

6. The method according to claim 2 wherein the processing step includes the steps of determining if a prescribed route has been withdrawn, and analyzing an Autonomous System path associated with said withdrawn route to identify its origin Autonomous System.

7. The method according to claim 1 wherein the step of processing said routing data includes the step of detecting the existence of a newly advertised route to independently verify the existence of said newly advertised route.

8. The method according to claim 1 further including the step of measuring loss of packets transmitted between peers.

9. The method according to claim 1 further including the steps of:

testing for connectivity between peers; and comparing the connectivity between a first pair of pees to the connectivity between a second pair of peers.

10. A system for detecting and reporting routing violations in a network of interconnected peers comprising:

a router for acquiring routing information from each of the peers, including routes advertised by said peers:

buffer means for storing said routing information;

a monitoring and measurement server for processing the routing information to detect a routing violation and for reporting said violation, where a routing violation is caused routing information.

11. The system according to claim 10 further including a database coupled to the monitoring and measurement server for providing to said server information of officially advertised routes to enable said server to compare the officially advertised routes to those advertised by said peers.

12. The system according to claim 10 further including a trouble ticket system coupled to said server for receiving reports of routing violations, said trouble ticket system, in response to said routing violation, signaling a technician to manually correct said violation.

13. The system according to claim 10 further including a trouble ticket system coupled to said server for receiving reports of routing violations, said trouble ticket system, in response to said routing violation, automatically correcting said violation.

14. The system according to claim 10 further including a trouble ticket system coupled to said server for receiving reports of routing violations, said trouble ticket system, in response to said routing violation, automatically signaling an external system to correct said violation.

* * * * *